United States Patent [19]
Hurst, Jr.

[11] Patent Number: 5,115,301
[45] Date of Patent: May 19, 1992

[54] APPARATUS FOR ELIMINATING A MOTION ARTIFACT IN A WIDESCREEN TELEVISION SIGNAL

[75] Inventor: Robert N. Hurst, Jr., Hopewell, N.J.

[73] Assignee: General Electric Company, Princeton, N.J.

[21] Appl. No.: 635,433

[22] Filed: Dec. 28, 1990

[51] Int. Cl.5 .................... H04N 11/06; H04N 7/04
[52] U.S. Cl. .................................... 358/12; 358/141
[58] Field of Search .................... 358/12, 11, 141, 15

[56] References Cited

U.S. PATENT DOCUMENTS

| | | | |
|---|---|---|---|
| 4,845,562 | 7/1989 | Koslov et al. | 357/141 |
| 4,884,127 | 11/1989 | Isnardi et al. | 358/141 |
| 4,949,167 | 8/1990 | Isnardi et al. | 358/12 |
| 4,967,263 | 10/1990 | Dieterich | 358/11 |
| 4,979,020 | 12/1990 | Isnardi | 358/12 |

Primary Examiner—David K. Moore
Assistant Examiner—Wendy R. Greening
Attorney, Agent, or Firm—Joseph S. Tripoli; Eric P. Herrmann; Ronald H. Kurdyla

[57] ABSTRACT

Main panel and side panel components of a widescreen television signal are intraframe processed over different frequency ranges, resulting in a noticeable difference between "judder" motion artifacts of main and side panel images displayed by a receiver. A side panel field difference signal encoded in a transmitted widescreen signal is used by a receiver to eliminate the differential judder effect of displayed main and center panel information. The field difference signal contains field difference information over a range of frequencies between a first frequency above which the main panel component is intraframe processed, and a different second frequency above which the side panel component is intraframe processed.

12 Claims, 4 Drawing Sheets

APPARATUS FOR ELIMINATING A MOTION ARTIFACT IN A WIDESCREEN TELEVISION SIGNAL

FIELD OF THE INVENTION

This invention concerns apparatus for eliminating a motion artifact produced by intraframe processing side panel information and center panel information of a widescreen television signal.

BACKGROUND OF THE INVENTION

A conventional television system, such as a system in accordance with the NTSC broadcast standard adopted in the United States and elsewhere, processes a television signal representative of an image with a 4:3 aspect ratio (the ratio of the width to the height of a displayed image). Recently, there has been interest in using higher aspect ratio images for television systems, such as 5:3, 16:9 and 2:1, since such higher aspect ratios more nearly approximate or equal the aspect ratio of the human eye compared to the 4:3 aspect ratio of a standard television display. An advanced television system for producing 5:3 aspect ratio images is described, for example, in U.S. Pat. No. 4,949,167—Isnardi et al. In this system side panel image information is encoded by time compressing low frequency side panel luminance and chrominance information into horizontal overscan regions of a main panel component, and high frequency side panel luminance and chrominance information are encoded by time expansion and modulation of an auxiliary subcarrier.

The system disclosed in U.S. Pat. No. 4,949,167 employs intraframe signal processing at the transmitter and receiver. Intraframe processing is a signal processing technique which prepares two signals for mutual combining so that they can be recovered efficiently and accurately afterwards, such as by means of a field storage device. The type of signal processing employed for this purpose makes two signals identical on a field basis, i.e., by obtaining two samples with identical values one field (262H) apart. Intraframe averaging, a form of paired pixel processing, is one type of intraframe processing. In intraframe averaging pairs of fields are made identical by averaging pixels that are 262H apart, with the average value replacing the original values in each pair. This process occurs within a frame and does not cross frame boundaries.

In the system described in U.S. Pat. No. 4,949,167, intraframe averaging high frequency main and side panel information reduces the temporal update rate of these frequencies by half, i.e., to an update rate of 1/30 of a second, which is one-half of the normal field update rate of 1/60 of a second. The vertical resolution of these frequencies also is reduced in half. The reduced temporal update rate, particularly with respect to luminance frequencies, can result in perceived jerky motion, sometimes referred to as "judder", depending on the location of the frequency split point between the intraframe processed high frequencies, and the low frequencies which are not intraframe processed.

The frequency split point may be different for main panel and side panel intraframe processing for a variety of reasons relating to system signal processing requirements. For example, in the system of U.S. Pat. No. 4,949,167 the main panel information is intraframe processed above 1.5 MHz. Side panel high frequency information with a bandwidth of 700 KHz–5.0 MHz is time expanded to produce a side panel signal with a 1.16 MHz bandwidth, which is subjected to intraframe processing in its entirety. The different frequency split points of the main and side panels (1.5 MHz and 0.7 MHz) may produce a difference between the judder perceived in the main and side panels, i.e., "differential judder". Thus low frequencies not subject to intraframe processing are sent with a relatively "smooth" 60 Hz update rate, intraframe averaged high frequencies are sent with a 30 Hz update rate exhibiting judder, and main panel-side panel differential judder is likely to be perceived as noted above. The apparatus described herein in accordance with the principles of the present invention is directed to significantly reducing or eliminating the differential judder effect.

SUMMARY OF THE INVENTION

In accordance with the principles of the present invention, a main panel component of a widescreen signal is intraframe processed above a first frequency. A side panel component of the widescreen signal is intraframe processed above a different second frequency. An auxiliary signal, containing field difference information over a range of frequencies between the first and second frequencies, is used to eliminate a differential motion artifact (judder) in an image displayed at a receiver.

DETAILED DESCRIPTION

Figure 1:
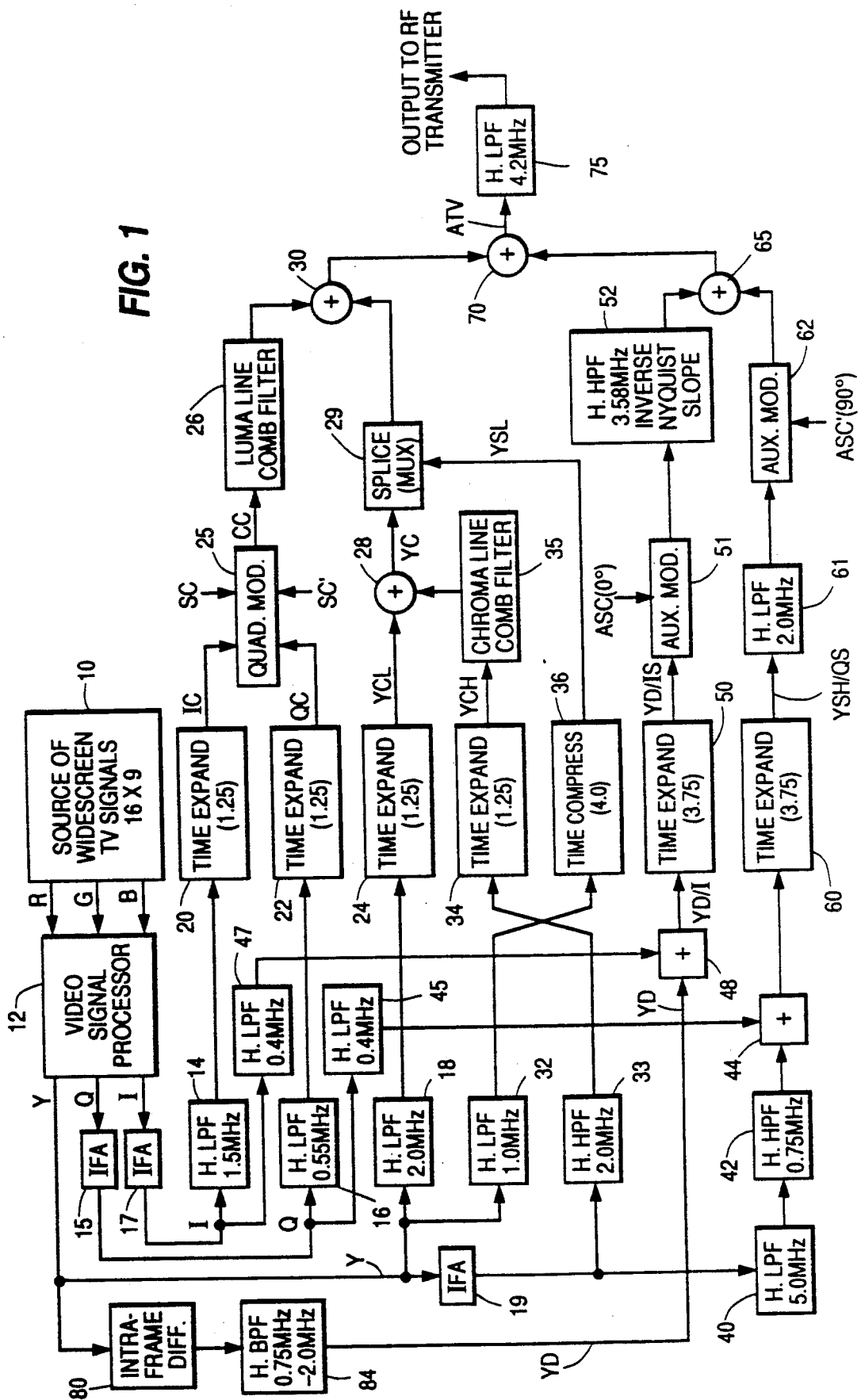
FIG. 1 shows a portion of an NTSC compatible widescreen transmitter/encoder including apparatus according to the present invention.

In the NTSC compatible widescreen transmitter/encoder of FIG. 1, a widescreen television signal source 10, such as a color television camera, provides a 16×9 wide aspect ratio television signal with color components R, G and B. These signals are processed by a video signal processor 12 to provide luminance output signal Y and color difference output signals I and Q, all in interlaced form.

Encoding of center (main) panel information will be discussed first. Color difference signals I, Q from unit 12 are interframe averaged (IFA) by units 17 and 15 before being respectively filtered by filters 14 and 16 and time expanded by units 20 and 22, respectively. Luminance signal Y from processor 12 is filtered by a 2.0 MHz horizontal low pass filter 18 before being time expanded by a unit 24. Units 20, 22 and 24 exhibit a time expansion factor of 1.25 and operate only on the center (main) panel portion of the I, Q, Y signals from filters 14, 16 and 18. Thus time expanders 20 and 22 respectively provide output center panel color difference signals IC and QC. Time expander 24 provides an output luminance center panel low frequency signal YCL. Signals IC and QC quadrature modulate 3.58 MHz quadrature phased subcarriers SC and SC' in a modulator 25 to produce a modulated center panel chrominance signal CC. This signal is processed by a luminance line comb filter 26 to remove luminance information in spectral band normally occupied by luminance information before being applied to a center panel chrominance input of an adder 30.

The center panel luminance signal input to adder 30 is developed as follows. The Y luminance signal from processor 12 is intraframe averaged by a unit 19, filtered by a 2.0 MHz high pass filter 33, and time expanded by a unit 34 which operates only during the center panel interval, to develop center panel high frequency luminance signal YCH. Signal YCH contains intraframe averaged center panel high frequency information above 2.0 MHz. This signal is processed by a line comb filter 35 to remove information in spectral bands normally occupied by chrominance information before being combined with center panel low frequency luminance signal YCL in adder 28 to produce a center panel luminance signal YC.

Expanded center panel luminance signal YC is spliced to compressed side panel low frequency luminance information YSL by means of a multiplexer 29. Briefly, as discussed in detail in U.S. Pat. No. 4,949,167, signal YSL constitutes time compressed low frequency left and right side panel luminance information which is placed in left and right horizontal overscan regions of the center panel signal by means of multiplexer 29. Signal YSL is obtained by filtering signal Y from processor 12 by means of a 1.0 MHz horizontal low pass filter 32, then selectively time compressing the side panel portions of the filtered signal by means of a compressor 36 which operates only during the side panel intervals. Signal YSL from compressor 36 is applied to splicer 29. The output of multiplexer/splicer 29 is applied to the luminance input of center panel signal combiner 30.

High frequency side panel information is processed as follows. The "I" color difference component from processor 12 is intraframe averaged by a unit 17 before being filtered by a 0.4 MHz horizontal low pass filter 47 to produce a narrowband I signal. The output signal from filter 47 is combined in an adder 48 with a high frequency luminance field difference signal YD to produce a combined signal YD/I. Signal YD contains field difference information which is used to compensate for the differential judder effect noted previously. Additional information concerning signal YD will be provided subsequently. The output signal from adder 48 is time expanded during side panel intervals by a time expander 50 to produce side panel combined signal YD/IS. This signal is applied to an auxiliary modulator 51 for amplitude modulating an in-phase (0°) auxiliary subcarrier ASC to produce a double sideband modulated signal (as will be seen in FIG. 1b). Subcarrier ASC exhibits a frequency of 3.58 MHz, the frequency of the standard chrominance subcarrier, but exhibits a phase which inverts from field-to-field unlike the standard chrominance subcarrier.

The modulated signal from unit 51 is applied to a 3.58 MHz horizontal high pass filter 52 having an inverse Nyquist slope. Filter 52 mirrors a filter at a receiver having a Nyquist slope to achieve a desired amplitude response at a receiver demodulator. Specifically, the cascade of inverse Nyquist slope filter 52 at the encoder with a complementary Nyquist slope filter at a receiver decoder (as will be seen in FIG. 2) produces a desired flat amplitude response for a high frequency side panel luminance signal YSH when demodulated at the receiver. Signal YSH modulates a quadrature phased 3.58 MHz subcarrier ASC' as will be discussed below. Such cascade of Nyquist slope filters also assures that modulated auxiliary subcarrier ASC exhibits symmetrical double sideband IS information so that proper quadrature demodulation is achieved at the decoder, i.e., so that signal IS maintains a desired phase characteristic and does not crosstalk into components YSH or QS.

Side panel high frequency luminance information and side panel color difference component "Q" are combined for processing. The Q output signal from processor 12, after being intraframe averaged by unit 15, is conveyed via a 0.4 MHz horizontal low pass filter 45 to a combiner 44, where it is combined with signal Y from unit 12 which has been intraframe averaged by unit 19 and filtered by a 5.0 MHz horizontal low pass filter 40 and a 0.75 MHz horizontal high pass filter 42. The output signal from combiner 44 is time expanded by a unit 60. Expander unit 60 operates during the side panel intervals for producing combined side panel highs signal YSH/QS, i.e., intraframe processed side panel high frequency luminance information combined with intraframe processed side panel Q color difference information. Because time expander 60 is not ideal, low energy repeat spectra are generated above 2.0 MHz. Low pass filter 61 removes these repeat spectra and prevents them from cross-talking into the main (center) panel component after modulation.

Combined signal YSH/QS is coupled via 2.0 MHz horizontal low pass filter 61 to an auxiliary modulator 62, which modulates an auxiliary 3.58 MHz subcarrier ASC' with the output signal from filter 61. Subcarrier ASC' is in phase quadrature with subcarrier ASC of modulator 51 and exhibits a similar phase inversion from field to field. The output signal from modulator 62 and the output signal from filter 52 are combined by an adder 65. An adder 70 combines an output signal from adder 30 (containing center panel information and low frequency side panel information) with an output signal from adder 65 (containing high frequency side panel information) to produce a compatible widescreen advanced television signal ATV. This signal is low pass filtered by a 4.2 MHz filter 75 to restrict signal ATV to the standard NTSC channel bandwidth before being applied to an RF transmitter for broadcast.

Figure 1A:
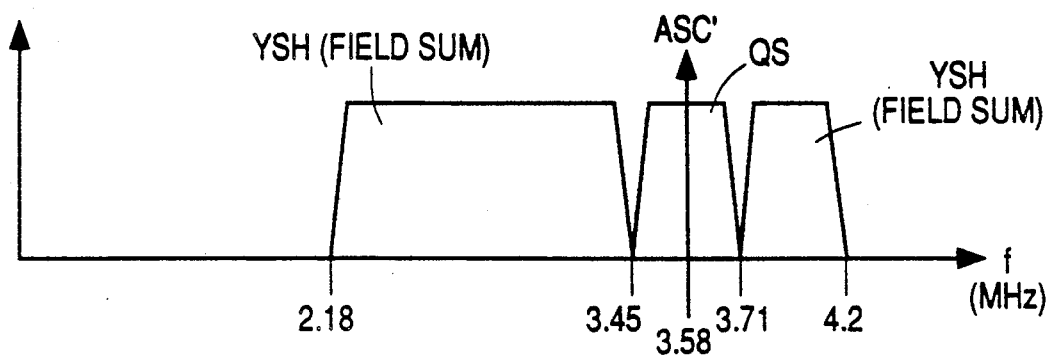
FIGS. 1a and 1b illustrate modulation frequency spectrums associated with the apparatus of FIG. 1.
Figure 1B:
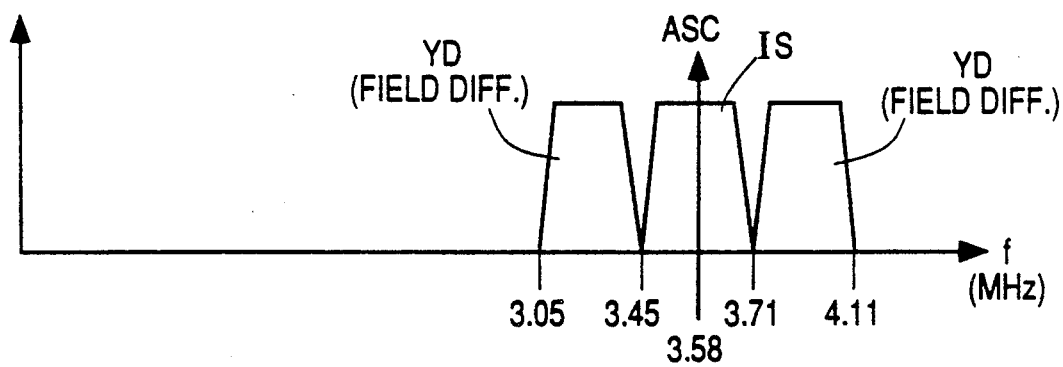

Intraframe averaging the center panel information from 2 MHz up produces a "channel" that is 2.2 MHz wide (i.e., the 4.2 MHz luminance bandwidth minus 2.0 MHz). As shown in FIG. 1a, the YSH field sum component of combined signal YSH/QS modulates 3.58 MHz auxiliary carrier ASC in vestigial sideband form. Frequency multiplexed component QS of combined signal YSH/QS modulates carrier ASC in double sideband form. As shown in FIG. 1b, combined signal YD/IS contains frequency multiplexed components YD and IS, which modulate quadrature phased 3.58 MHz carrier ASC' in double sideband form.

The intraframe averaged high frequency side panel information, YSH, is updated at a 30 Hz rate. However, to avoid a side-center panel differential luminance judder effect in the region between 0.75 MHz (as determined by filter 42) and 2.0 MHz (as determined by filter 33), the information in the 0.75 MHz-2.0 MHz band should be sent at a 60 Hz update rate. In other words, intraframe averaged information in the YSH field sum component is the average of two fields within a given image frame, i.e., $(F1+F2)/2$ where F1 and F2 are the constituent odd and even fields within a frame of the interlaced signal processed by the encoder of FIG. 1. To eliminate differential luminance judder in the 0.75 MHz-2 MHz band for an image displayed at a receiver, both F1 and F2 must be recovered in this band for the high frequency side panel luminance component. This is accomplished by generating and conveying a field difference signal (F1−F2)/2 in the side panel 0.75 MHz-2.0 MHz band, so that a receiver decoder can recover high frequency side panel field information F1 and F2 by summing and differencing in the 0.75 MHz-2.0 MHz band as follows:

$$F1 = \left[ \frac{F1 + F2}{2} + \frac{F1 - F2}{2} \right]$$

$$F2 = -\left[ \frac{F1 + F2}{2} - \frac{F1 - F2}{2} \right]$$

Field difference component (F1−F2)/2 is the differential judder compensation ("de-judder") component conveyed by signal YD.

Difference signal YD is developed by an intraframe differencing unit 80 which receives luminance signal Y from processor 12. The field difference signal from unit 80 is bandlimited by a horizontal bandpass filter 84 which restricts the bandwidth of this field difference signal to 0.75 MHz-2 MHz. Resulting field difference signal YD is combined with the sidepanel I component in unit 48 as discussed.

Figure 2:
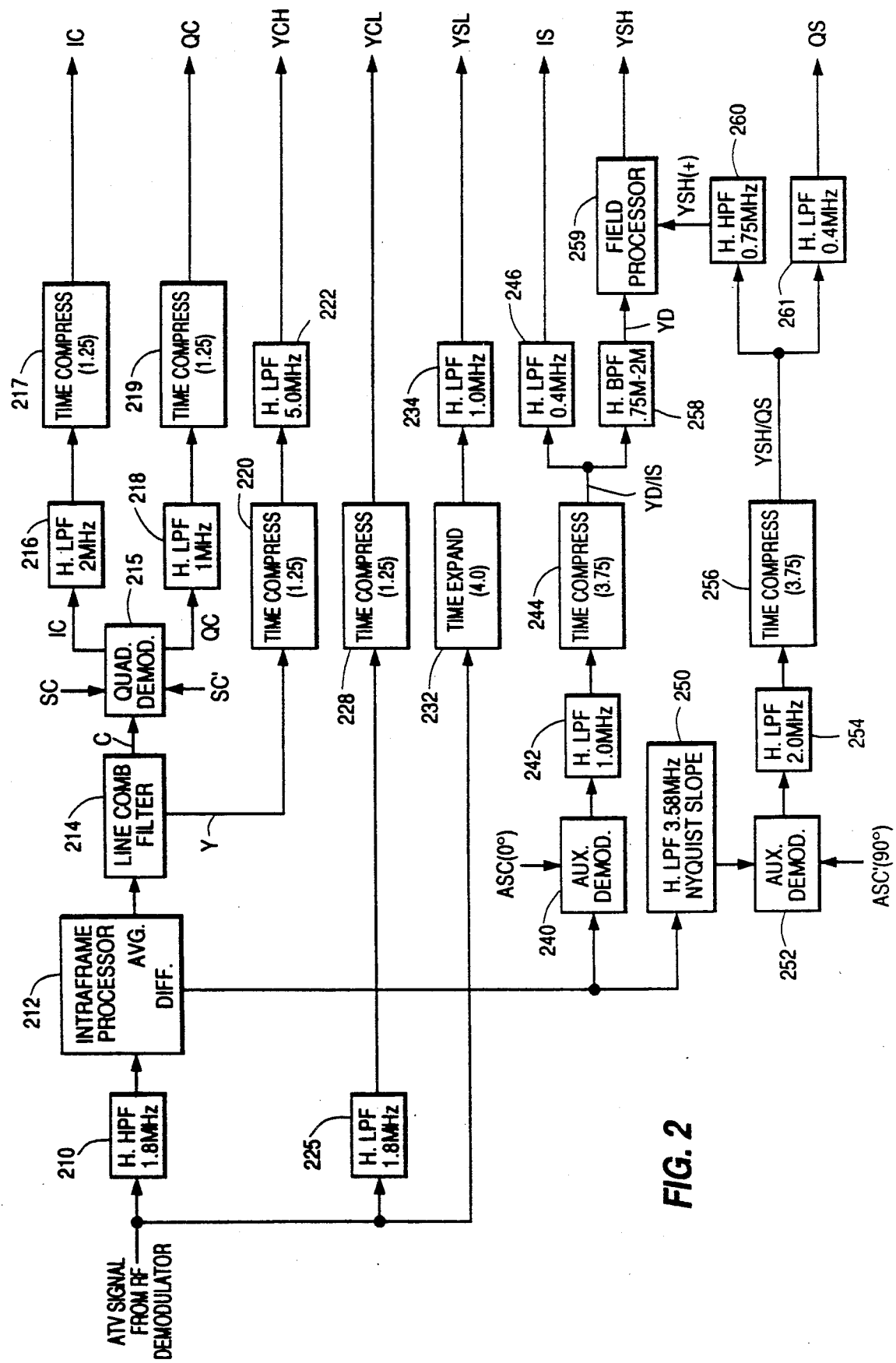
FIG. 2 shows a portion of an NTSC compatible widescreen receiver/decoder including apparatus according to the present invention.

FIG. 2 shows a portion of a widescreen television receiver including apparatus for decoding the widescreen ATV signal generated by the arrangement of FIG. 1. A received baseband encoded ATV signal (e.g., from an RF tuner and demodulator assembly not shown) is applied to a 1.8 MHz horizontal high pass filter 210, the output of which is applied to an intraframe processor 212. Processor 212 averages (additively combines) and differences (subtractively combines) image lines 262H apart within frames above 1.8 MHz to recover high frequency main panel signal information at an output AVG. modulated side panel high frequency information is provided at a differencing output DIFF of processor 212.

The main panel component from the AVG output of processor 212 is filtered by a horizontal line comb filter 214 to provide separated luminance (Y) and chrominance (C) output components. The separated main panel luminance component is time compressed by a unit 220, which operates only during the main panel interval, to restore separated main panel component Y to its original spatial relationship. The time compressed signal from unit 220 is then filtered by a 5.0 MHz horizontal low pass filter 222 to develop main (center) panel luminance high frequency component YCH. The separated main panel chrominance information (C) is quadrature demodulated by a demodulator 215 responsive to quadrature phased reference signals SC and SC' having the frequency and phase characteristics of corresponding subcarrier signals provided at the encoder/transmitter. Demodulated center panel I and Q color difference components IC and QC are horizontally low pass filtered by filters 216 and 218 respectively before being time compressed by units 217 and 219. Time compression units 217 and 219 operate during the center panel intervals to restore the original spatial relationship of signals IC and QC.

The center panel low frequency luminance information is restored to its original form by means of filter 225 and time compressor 228. Horizontal low pass filter 225 passes frequencies of input signal ATV which are below about 1.8 MHz to time compressor 228, which operates during the center panel interval to restore low frequency center panel luminance information to its original spatial relationship, as signal YCL.

The input ATV signal is also applied to a time expander 232, which operates during the side panel intervals to restore the original spatial format of the side panel information which had been time compressed and placed in the horizontal overscan regions. The output signal from expander 232 is processed by a 1.0 MHz horizontal low pass filter 234 to provide low frequency side panel luminance signal YSL in its original spatial form.

To recover combined signal YD/IS containing field difference signal YD and side panel I color difference component IS, the signal from the DIFF output of processor 212 is demodulated by an auxiliary demodulator 240 which responds to an auxiliary reference signal ASC having the same frequency and phase characteristics as subcarrier ASC developed at the encoder. The demodulated signal from unit 240 is filtered by a 1.0 MHz horizontal low pass filter 242, time compressed during side panel intervals by a unit 244 to restore the original spatial format of the signal component, producing combined signal YD/IS at an output. Signal YD/IS is horizontally low pass filtered by a filter 246 to extract component IS, and is horizontally bandpass filtered by a 0.75 MHz-2.0 MHz filter 258 to produce differential luminance judder compensation signal YD. This field difference signal is of the form (F1−F2)/2 as discussed, and is combined in a field processor unit 259 with recovered high frequency sidepanel luminance field sum component YSH (+) of the form (F1+F2)/2 from a filter 260 to produce a restored widepanel luminance highs component YSH. Recovered field difference signal YD is combined in unit 259 with side highs field sum component YSH (+) from filter 260 in order to "re-animate" the 0.75 MHz-2 MHz sidepanel luminance band to a 60 Hz update rate from a 30 Hz update rate. Field processor 259 achieves this by adding the signals from units 258 and 260 during the first field of a given image frame, and by subtracting these signals during the second field. That is, unit 259 reverses the polarity of signal YD on alternate fields and adds the reversed polarity signal to the signal from unit 260 to produce recovered signal YSH with restored full vertical-temporal resolution in the side panel luminance signal up to 2 MHz, causing it to match that of the main panel. In addition, the use of signal YO improves the vertical resolution of still images in the 0.75 MHz to 2.0 MHz band.

More specifically, to recover side panel components YSH and QS, the signal from the DIFF output of processor 212 is processed by a 3.58 MHz horizontal low pass Nyquist slope filter 250 before being demodulated by auxiliary demodulator 252. With regard to the use of Nyquist filter 250 it is noted that in this example component QS is a double sideband signal modulation component of auxiliary subcarrier ASC', and component YSH is a vestigial sideband modulation component of auxiliary subcarrier ASC'. Imparting a Nyquist slope to the higher energy double sideband region of the combined YSH/QS modulated signal reduces the effective energy of the double sideband region by one-half, so that a flat demodulation amplitude response results over the auxiliary subcarrier modulation frequencies. Demodulator 252 also responds to an auxiliary reference signal ASC' having the same frequency and phase characteristics as auxiliary subcarrier ASC' developed at the encoder. A demodulated output signal from demodulator 252 contains combined YSH and QS components and is filtered by a 2.0 MHz horizontal low pass filter 254.

The output signal from filter 254 is time compressed by a unit 256 which operates during side panel intervals to restore the original spatial relationship of the combined YSH/QS side panel information. Output signal YSH/QS from compressor 256 is separated into the field averaged YSH (+) component by means of 0.75 MHz horizontal high pass filter 260, as discussed above. A 0.4 MHz horizontal low pass filter 261 produces separated component QS at an output.

Figure 3:
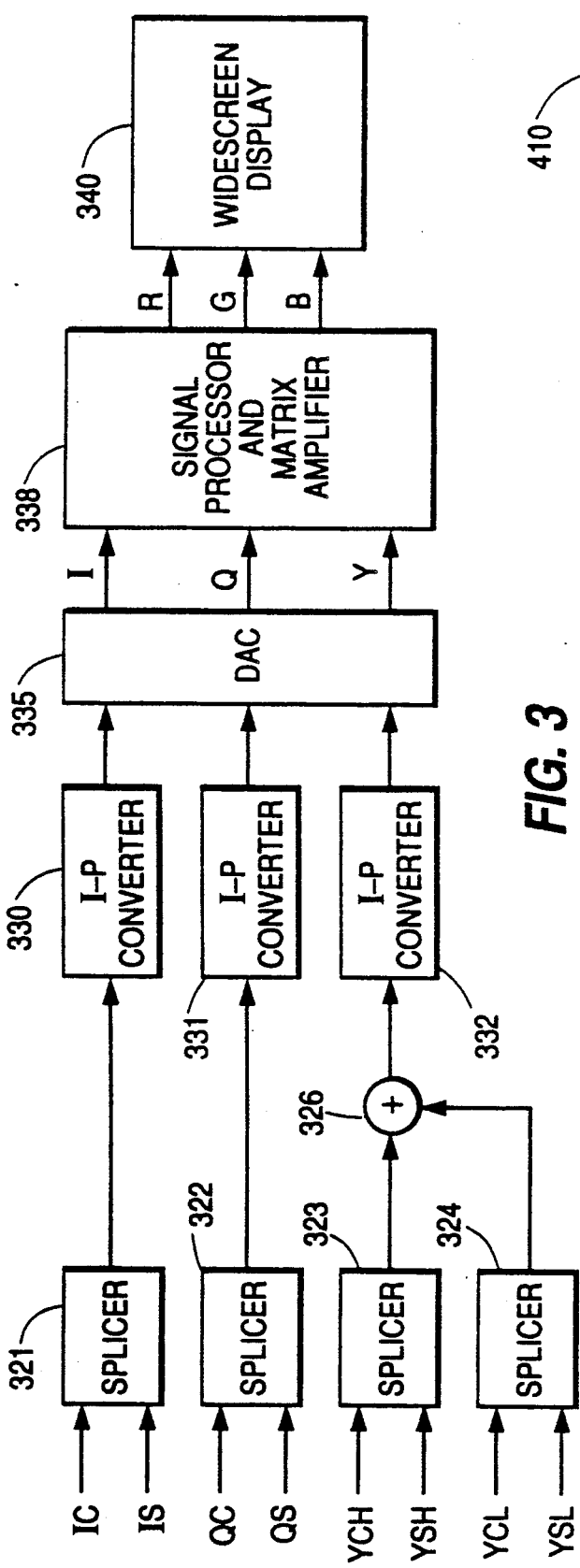
FIG. 3 shows an additional portion of the receiver/decoder of FIG. 2.

The output signals developed by the decoder apparatus of FIG. 2 are processed further as shown in FIG. 3. Signals IC and IS, QC and QS, YCH and YSH, and YCL and YSL are respectively spliced by splicers 321, 322, 323 and 324 respectively. Output signals from splicers 323 and 324 are combined by an adder 326 to provide a restored widescreen luminance signal with main panel and side panel information. The widescreen chrominance signals from splicers 321 and 322 and the widescreen luminance signal from adder 326 are converted from interlaced to progressive scan format by means of converters 330-332 before being converted to analog form via a digital-to-analog converter unit 335. Widescreen analog signals I, Q, Y are matrixed and processed by conventional video signal processing circuits in a network 338 to produce color image representative signals R, G and B suitable for display by a widescreen image reproducing device 340.

Figure 4:
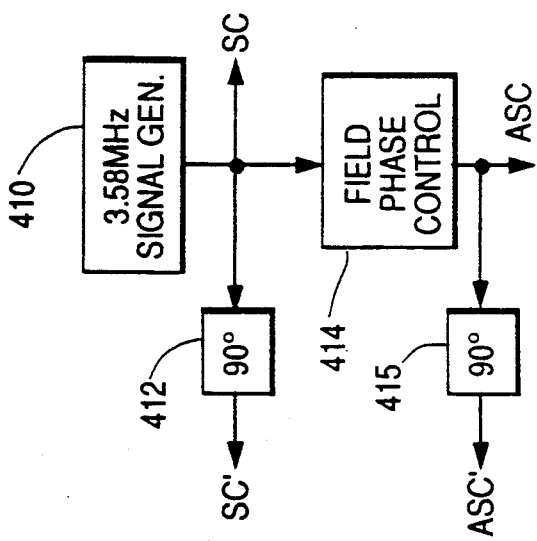
FIG. 4 shows additional details of the disclosed apparatus.

FIG. 4 depicts apparatus suitable for generating quadrature phased signals SC and SC', and quadrature phased auxiliary signals ASC and ASC'. A signal generator 410 provides a 3.58 MHz sinusoidal signal SC at a nominal 0° phase. This signal is phase shifted 90° by a network 412 to produce signal SC'. Signal ASC is derived from signal SC by means of a field phase control unit 414, which produces auxiliary signal ASC with a phase that reverses from field to field relative to the phase of a standard chrominance subcarrier. A 90° phase shifter 415 produces auxiliary signal ASC' in phase quadrature with auxiliary signal ASC.

What is claimed is:

1. In a system for processing a widescreen television signal having a main panel component, a side panel component and an image aspect ratio greater than that of a standard aspect ratio television signal, apparatus comprising:
    first means for intraframe processing said main panel component above a first frequency, within a given image frame;
    second means for intraframe processing said side panel component above a second frequency, different from said first frequency, within said image frame; and
    means for generating an auxiliary signal derived from within said image frame and containing field difference information over a range of frequencies between said first and second frequencies.

2. Apparatus according to claim 1, wherein said first and second means intraframe average said main panel component and said side panel component, respectively.

3. Apparatus according to claim 1, wherein said intraframe processed side panel component and said auxiliary signal modulate a carrier; and
    said modulated carrier is combined with said intraframe processed main panel component for transmission via an output channel.

4. Apparatus according to claim 3 wherein said side panel component includes high frequency luminance information, chrominance information of a first type, and chrominance information of a second type;
    said high frequency side panel luminance information and said chrominance information of said first type modulate one phase of said carrier; and
    said auxiliary signal and chrominance information of said second type modulate another phase of said carrier.

5. Apparatus according to claim 4, wherein said carrier is quadrature amplitude modulated; and
    said chrominance information of said first and second types correspond to color difference information.

6. In a system for receiving a widescreen television signal having a main panel component, a side panel component, an auxiliary signal containing intraframe field difference information over a prescribed frequency range, and an image aspect ratio greater than that of a standard aspect ratio television signal, apparatus comprising
    means for separating said widescreen television signal into said main panel component and said side panel component; and
    means for combining said auxiliary signal with one of said separated main and side panel components to increase the temporal update rate of said one component so that said main and side panel components exhibit substantially equal temporal update rates over said frequency range.

7. Apparatus according to claim 6, wherein said auxiliary signal is combined with said side panel component.

8. Apparatus according to claim 6, wherein said auxiliary signal is combined with a side panel component containing high frequency information substantially exclusive of low frequency information.

9. Apparatus according to claim 6 wherein said received widescreen television signal contains a carrier with one phase thereof modulated by high frequency side panel information and another phase thereof modulated by said auxiliary signal, wherein said apparatus further includes
    demodulator means for recovering said high frequency side panel information and said auxiliary signal; and
    means for combining said recovered high frequency side panel information with said auxiliary signal.

10. Apparatus according to claim 9, wherein said one phase of said carrier signal is additionally modulated with a first type of side panel chrominance information; and
    said other phase of said carrier signal is additionally modulated with a second type of side panel chrominance information.

11. Apparatus according to claim 9, wherein said demodulator is a quadrature amplitude demodulator.

12. Apparatus according to claim 6, wherein said separating means includes means for intraframe processing said received widescreen television signal to produce intraframe averaged and intraframe differenced output signals.

* * * * *